(12) United States Patent
Cortner et al.

(10) Patent No.: US 9,567,508 B2
(45) Date of Patent: Feb. 14, 2017

(54) DRY DRILLING FLUID ADDITIVES AND METHODS RELATING THERETO

(71) Applicant: Halliburton Energy Services, Inc., Houston, TX (US)

(72) Inventors: Thomas Scott Cortner, Willis, TX (US); Preston Andrew May, Porter, TX (US); Ryan Patrick Collins, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/889,915

(22) PCT Filed: Jan. 5, 2015

(86) PCT No.: PCT/US2015/010176
§ 371 (c)(1),
(2) Date: Nov. 9, 2015

(87) PCT Pub. No.: WO2016/111676
PCT Pub. Date: Jul. 14, 2016

(65) Prior Publication Data
US 2016/0355721 A1      Dec. 8, 2016

(51) Int. Cl.
*C09K 8/12*      (2006.01)
*E21B 7/04*      (2006.01)
(Continued)

(52) U.S. Cl.
CPC ............... *C09K 8/035* (2013.01); *C09K 8/12* (2013.01); *E21B 7/04* (2013.01); *E21B 21/062* (2013.01); *C09K 2208/12* (2013.01)

(58) Field of Classification Search
CPC ....... C09K 8/12; C09K 8/035; C09K 2208/12; E21B 7/04; E21B 21/062
See application file for complete search history.

(56) References Cited

U.S. PATENT DOCUMENTS 4,447,342 A * 5/1984 Borchardt .............. C09K 8/588
166/275
4,719,021 A * 1/1988 Branch, III .............. C09K 8/22
507/107

(Continued)

FOREIGN PATENT DOCUMENTS

| EP | 2151486 A1 | 2/2010 |
|---|---|---|
| WO | 9925787 A1 | 5/1999 |
| WO | 2014014888 A1 | 1/2014 |

OTHER PUBLICATIONS

International Search Report and Written Opinion for PCT/US2015/010176 dated Sep. 30, 2015.

*Primary Examiner* — Zakiya W Bates
*Assistant Examiner* — Crystal J Miller
(74) *Attorney, Agent, or Firm* — McDermott Will & Emery LLP; Tenley Krueger

(57) ABSTRACT

Dry drilling fluid additives may include a dry mixture that comprises a clay stabilizing agent at about 76% to about 93% by weight of the dry mixture, a dispersant at about 3% to about 6% by weight of the dry mixture, and a surfactant at about 4% to about 18% by weight of the dry mixture. Such dry drilling fluid additives may be useful in methods and systems for drilling wellbore penetrating subterranean formations, especially deviated and highly-deviated wellbores.

19 Claims, 1 Drawing Sheet

(51) Int. Cl.
*C09K 8/035* (2006.01)
*E21B 21/06* (2006.01)

(56) References Cited

U.S. PATENT DOCUMENTS

| | | | |
|---|---|---|---|
| 5,030,366 A | | 7/1991 | Wilson et al. |
| 5,343,950 A | | 9/1994 | Hale et al. |
| 5,361,842 A | * | 11/1994 | Hale ................. C04B 28/08 166/292 |
| 5,370,185 A | * | 12/1994 | Cowan ............... C04B 28/04 166/293 |
| 5,789,352 A | * | 8/1998 | Carpenter ........... C09K 8/601 166/291 |
| 6,818,597 B2 | * | 11/2004 | Harris ............... A61K 8/731 507/110 |
| 7,232,793 B1 | | 6/2007 | King et al. |
| 7,351,680 B2 | * | 4/2008 | Hayes ................. C09K 8/03 166/305.1 |
| 7,384,892 B2 | | 6/2008 | Melbouci et al. |
| 7,566,686 B2 | | 7/2009 | Kippie et al. |
| 7,572,756 B2 | | 8/2009 | Patel et al. |
| 8,627,888 B2 | | 1/2014 | Santra et al. |
| 8,653,610 B2 | | 2/2014 | Jagannathan et al. |
| 2005/0187113 A1 | * | 8/2005 | Hayes ................. C09K 8/03 507/119 |
| 2009/0036330 A1 | * | 2/2009 | Carbajal .............. C09K 8/12 507/129 |
| 2010/0132951 A1 | | 6/2010 | Hossaini et al. |
| 2010/0267592 A1 | | 10/2010 | Brazzel |
| 2012/0053092 A1 | | 3/2012 | Marangoni et al. |
| 2014/0110643 A1 | | 4/2014 | Kimura et al. |

\* cited by examiner

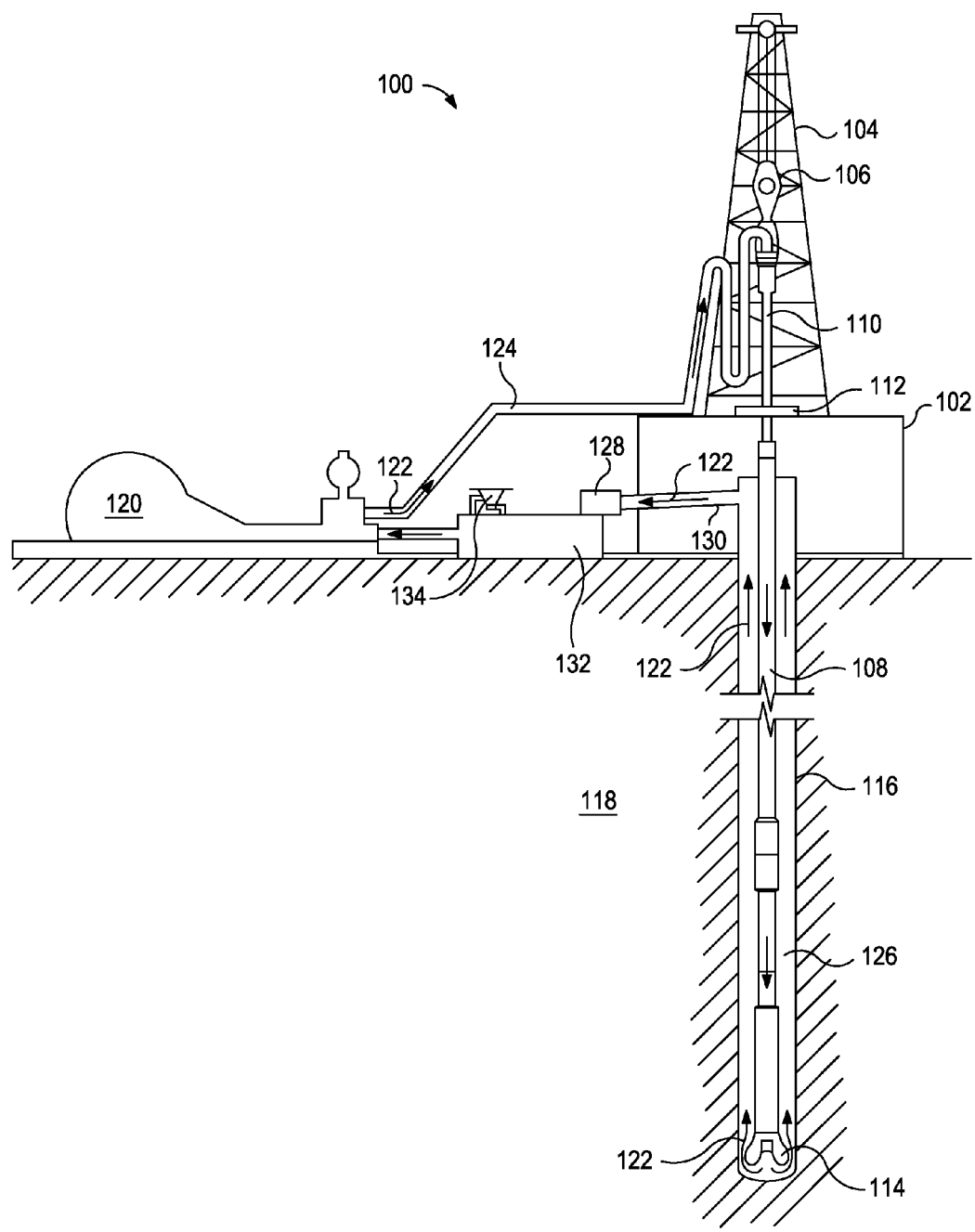

DRY DRILLING FLUID ADDITIVES AND METHODS RELATING THERETO

BACKGROUND

The embodiments described herein relate to drilling fluid additives.

In drilling operations, a drilling fluid is implemented to cool the drill bit and cake the sides of the wellbore to mitigate caving in until a liner or cement casing is put in place. Moreover, the weight of the drilling fluid mitigates formation fluids (e.g., oil, gas, or water) from infiltrating into the wellbore during drilling.

Drilling fluids are typically complex fluids with several components (drilling fluid additives) that may be in a solid powder form or a liquid additive form. Drilling fluids are often precisely formulated taking into consideration several factors including, for example, the lithology of the formation, the formation pore pressure, and the drilling operational parameters (e.g., the rate of penetration and the angle of drilling). Variations in the concentration of drilling fluid additives can decrease the efficiency of the drilling operation and cause downhole problems. For example, if the drilling fluid is prepared with too high of a viscosity, the energy required to pump the fluid and trip the drill string may increase. In some instances, if the viscosity is too high, especially after incorporating drilling cuttings, the drilling fluid may become unpumpable and costly remedial operations may be needed to resume drilling fluid circulation. In another example, with too low of a viscosity, the drilling fluid may not effectively remove cuttings from the wellbore, which may cause the viscosity of the drilling fluid near the drill bit to be high, which may lead to cessation of drilling fluid circulation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 provides an illustration of an exemplary wellbore drilling assembly according to at least some embodiments for implementing the drilling fluids prepared with the dry mixtures disclosed herein.

DETAILED DESCRIPTION

The embodiments described herein relate to drilling fluid additives and, more specifically, dry drilling fluid additives that include clay stabilizers, dispersants, and surfactants.

As used herein, the term "dry" refers to a composition having no more water than is naturally present at standard ambient temperature and pressure (25° C. and 100 kPa absolute pressure) and 100% relative humidity.

The combination of the clay stabilizers, dispersants, and surfactants pre-blended into a dry mixture may provide for a more robust drilling fluid additive where operator error in measurement is reduced. Additionally, by having a single dry mixture, the number of additives that require shipping, inventorying, and storing is reduced, which may provide for more efficient drilling operation management. In addition, the combination of the clay stabilizers, dispersants, and surfactants in dry mixture may have unique environmental and operational advantages not provided when using these components separately and in liquid form.

In some instances, the dry mixture described herein or components thereof may foam the drilling fluid to a lesser degree than corresponding traditional liquid components. Foaming of the drilling fluid causes cavitation in the pumps used to convey the drilling fluid downhole, which reduces the pumpability of the drilling fluid and reduces the operably lifetime of the pumps. Additionally, excessive foaming can cause an unwanted increase in volume of the fluid.

In some instances, the dry mixture described herein or components thereof (e.g., the polyethylene glycol (PEG)/polypropylene glycol (PPG) copolymers and similar surfactants) are not acutely toxic to marine life. By comparison, some surfactants that are liquids at room temperature or dispersed in a liquid carrier and have been previously used in drilling fluids could potentially be marine toxic at certain concentrations, where the liquid surfactants may interfere with the oxygen uptake of marine life.

Additionally, the dry mixture described herein or components thereof may be certified by the American National Standards Institute (ANSI), National Sanitary Foundation (NSF) for being added to or brought in contact with drinking water, specifically ANSI/NSF 60 or ANSI/NSF 61 certified. Standard ANSI/NSF 60 refers to Standard ANSI/NSF 60, Drinking Water Treatment Chemicals—Health Effects," Dec. 11, 2009, Document Number NSF/ANSI 60-2009a, and Standard ANSI/NSF 61 refers to "Standard ANSI/NSF 61, Drinking Water System Components—Health Effects," Feb. 15, 2010, Document Number NSF/ANSI 61-2010.

A dry mixture may include, in some embodiments, clay stabilizing agents at about 76% to about 93% by weight of the dry mixture, dispersants at about 3% to about 6% by weight of the dry mixture, and surfactants at about 4% to about 18% by weight of the dry mixture.

Examples of clay stabilizing agents suitable for use in the dry mixture may include, but are not limited to, polyacrylamide, partially hydrolyzed polyacrylamide, polyethylene glycol, polydialllyldimethylammonium chloride (polyDADMAC), and the like, and any combination thereof. In some embodiments, clay stabilizing agents suitable for use in the dry mixture may have a molecular weight of about 10,000 g/mol to about 20,000 g/mol, including any subset therebetween.

As used herein, the term "dispersant" encompasses non-amphiphilic compounds or molecules suitable for dispersing particulates. Generally, the dispersants described herein may reduce the particle size, viscosity, or both of swellable clays by dispersing the swellable clays in the base fluid. Examples of dispersants suitable for use in the dry mixture may include, but are not limited to, polyacrylate, sodium acid polyphosphate, sodium hexametaphosphate, lignosulfonate, humic acid, tannic acid, and the like, and any combination thereof. In some embodiments, dispersants suitable for use in the dry mixture may have a molecular weight below about 10,000 g/mol (e.g., about 500 g/mol to about 10,000 g/mol, including any subset therebetween).

As used herein, the term "surfactant" refers to an amphiphilic compound or molecule with at least one hydrophobic group and at least one hydrophilic group. Generally, surfactants reduce the surface tension of the fluids in which they are dispersed. Examples of surfactants suitable for use in the dry mixture may include, but are not limited to, a polyethylene glycol (PEG)/polypropylene glycol (PPG) copolymer, cetylpyridinium chloride, benzalkonium chloride, sodium dodecylsulfate, sodium stearate, fatty alcohol ethoxylates, secondary alcohol ethoxylates (e.g., TERGITOL™ L & X series, available from DOW) and the like, and any combination thereof. In some embodiments, surfactants suitable for use in the dry mixture may have a molecular weight below about 25,000 g/mol (e.g., about 100 g/mol to about 25,000 g/mol, including any subset therebetween).

As used herein, the term "copolymer" is not limited to polymers comprising two types of monomeric units and, therefore, encompasses terpolymers, tetrapolymers, and the like, which may optionally be crosslinked. Further, the term "copolymer" encompasses any ordering and architecture of the two or more monomers include, but not limited to, random copolymers, alternating copolymers, block copolymer, graft copolymers, star polymers, branched polymers, hyperbranched polymers, and brush polymers, and the like. For example, a PEG/PPG copolymer may be a PEG-PPG-PEG triblock copolymer (sometimes referred to as polaxamers), including commercially available PLURONICS® PEG-PPG-PEG triblock copolymers from BASF and SYNPERONICS® from Croda.

Drilling fluids may be prepared by mixing an aqueous base fluid with a dry mixture described herein. In some embodiments, the dry mixture described herein may be included in a drilling fluid at about 0.1 pounds per barrel (lb/bbl) to about 5 lb/bbl of the aqueous fluid, including any subset therebetween.

Aqueous base fluids suitable for use in preparing the drilling fluids described herein may include fresh water, saltwater (e.g., water containing one or more salts dissolved therein), brine (e.g., saturated salt water), seawater, and any combination thereof.

In some embodiments, the drilling fluid may further comprise additives. Examples of additives may include, but are not limited to, salts, weighting agents, lost circulation materials, inert solids, corrosion inhibitors, viscosifying agents, surfactants, pH control additives, foaming agents, breakers, biocides, crosslinkers, chelating agents, scale inhibitors, gas, oxidizers, reducers, filtration control additives, and any combination thereof. Each additive may be included in the drilling fluid at about 0.1 lb/bbl to about 150 lb/bbl of the aqueous fluid, including any subset therebetween. A person of ordinary skill in the art, with the benefit of this disclosure, will recognize when an additive should be included in a wellbore strengthening fluid and/or drilling fluid, as well as an appropriate amount of said additive to include.

The drilling operations described herein may include drilling a wellbore penetrating a subterranean formation for water or hydrocarbon exploration, coring operations, mineral exploration, and the like.

The drilling operations may include drilling into a subterranean formation (e.g., coring a subterranean formation or drilling a wellbore penetrating the subterranean formation) using a drilling fluid prepared by mixing an aqueous base fluid with a dry mixture described herein.

The drilling fluids and methods described herein are applicable to wellbores at any angle including, but not limited to, vertical wells, deviated wells, highly deviated wells, horizontal wells, and hybrid wells comprising sections of any combination of the aforementioned wells. In some embodiments, a subterranean formation and wellbore may be provided with an existing fracture network. As used herein, the term "deviated wellbore" refers to a wellbore in which any portion of the well is that is oriented between about 55-degrees and about 125-degrees from a vertical inclination. As used herein, the term "highly deviated wellbore" refers to a wellbore that is oriented between about 75-degrees and about 105-degrees off-vertical.

Generally, when drilling a highly deviated wellbore, the solids and cuttings produced from drilling are different than those produced in vertical and deviated wells. Typically, the solids and cutting when drilling a highly deviated wellbore are finer and greater in concentration, which quickly viscosify the drilling fluid. Accordingly, low viscosity drilling fluids (e.g., 50 cP or less at 300 rpm) are generally preferred for drilling shale and other clay lithologies. The dry mixtures described herein may advantageously be suitable for producing such drilling fluids.

The exemplary drilling fluids prepared with the dry mixtures disclosed herein may directly or indirectly affect one or more components or pieces of equipment associated with the preparation, delivery, recapture, recycling, reuse, and/or disposal of the drilling fluids. For example, and with reference to FIG. 1, the drilling fluids prepared with the dry mixtures disclosed herein may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling fluid 122 prepared with a dry mixture disclosed herein through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the dry mixtures disclosed herein may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed dry mixtures may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed dry mixtures may be stored, reconditioned, and/or regulated until added to the drilling fluid 122.

As mentioned above, the drilling fluid 122 prepared with a dry mixture disclosed herein may directly or indirectly affect the components and equipment of the drilling assembly 100. For example, the disclosed drilling fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the drilling fluid 122.

The drilling fluid 122 prepared with a dry mixture disclosed herein may directly or indirectly affect the pump 120, which representatively includes any conduits, pipelines, trucks, tubulars, and/or pipes used to fluidically convey the drilling fluid 122 downhole, any pumps, compressors, or motors (e.g., topside or downhole) used to drive the drilling fluid 122 into motion, any valves or related joints used to regulate the pressure or flow rate of the drilling fluid 122, and any sensors (i.e., pressure, temperature, flow rate, etc.), gauges, and/or combinations thereof, and the like. The disclosed drilling fluid 122 may also directly or indirectly affect the mixing hopper 134 and the retention pit 132 and their assorted variations.

The drilling fluid 122 prepared with a dry mixture disclosed herein may also directly or indirectly affect the various downhole equipment and tools that may come into contact with the drilling fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluid 122 may also directly or indirectly affect any downhole heat exchangers, valves and corresponding actuation devices, tool seals, packers and other wellbore isolation devices or components, and the like associated with the wellbore 116. The disclosed drilling fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling fluid 122 prepared with a dry mixture disclosed herein may also directly or indirectly affect any transport or delivery equipment used to convey the drilling fluid 122 to the drilling assembly 100 such as, for example, any transport vessels, conduits, pipelines, trucks, tubulars, and/or pipes used to fluidically move the drilling fluid 122 from one location to another, any pumps, compressors, or motors used to drive the drilling fluid 122 into motion, any valves or related joints used to regulate the pressure or flow rate of the drilling fluid 122, and any sensors (i.e., pressure and temperature), gauges, and/or combinations thereof, and the like.

Embodiments disclosed herein include:
Embodiment A: a method that involves providing a dry mixture comprising a clay stabilizing agent at about 76% to about 93% by weight of the dry mixture, a dispersant at about 3% to about 6% by weight of the dry mixture, and a surfactant at about 4% to about 18% by weight of the dry mixture; mixing the dry mixture into an aqueous fluid, thereby producing a drilling fluid; and drilling at least a portion of a wellbore penetrating a subterranean formation with the drilling fluid;

Embodiment B: a drilling fluid additive that includes a dry mixture that comprises a clay stabilizing agent at about 76% to about 93% by weight of the dry mixture, a dispersant at about 3% to about 6% by weight of the dry mixture, and a surfactant at about 4% to about 18% by weight of the dry mixture; and Embodiment C: a system that includes a drilling assembly with a drill string extending therefrom and into a wellbore in a subterranean formation with at least one depleted zone having a plurality of fractures extending from the wellbore into the at least one depleted zone; and a pump fluidly coupled to the drill string, the drill string containing a drilling fluid prepared by mixing an aqueous fluid with a dry mixture that comprises a clay stabilizing agent at about 76% to about 93% by weight of the dry mixture, a dispersant at about 3% to about 6% by weight of the dry mixture, and a surfactant at about 4% to about 18% by weight of the dry mixture.

Each of embodiments A, B, and C may have one or more of the following additional elements in any combination: Element 1: wherein the clay stabilizing agent is selected from the group consisting of: polyacrylamide, partially hydrolyzed polyacrylamide, polyethylene glycol, polydiallyldimethylammonium chloride, and any combination thereof; Element 2: wherein the clay stabilizing agent may have a molecular weight of about 10,000 g/mol to about 20,000 g/mol; Element 3: wherein the dispersant is selected from the group consisting of: polyacrylate, sodium acid polyphosphate, sodium hexametaphosphate, lignosulfonate, humic acid, tannic acid, and any combination thereof; Element 4: wherein the dispersant may have a molecular weight of about 10,000 g/mol or less; Element 5: wherein the surfactant is selected from the group consisting of: a polyethylene glycol/polypropylene glycol copolymer, cetylpyridinium chloride, benzalkonium chloride, sodium dodecylsulfate, sodium stearate, a fatty alcohol ethoxylate, a secondary alcohol ethoxylate, and any combination thereof; Element 6: wherein the surfactant may have a molecular weight of about 25,000 g/mol or less; Element 7: wherein the dry mixture is ANSI/NSF certified for ANSI/NSF 60; and Element 8: wherein the dry mixture is ANSI/NSF certified for ANSI/NSF 61.

By way of non-limiting example, exemplary combinations applicable to A, B, C include: Elements 1 and 2 in combination; Elements 3 and 4 in combination; Elements 5 and 6 in combination; Elements 2, 4, and 6 in combination; Elements 1, 3, and 5 in combination; combinations of any of the foregoing; and any of the foregoing in combination with one or both of Elements 7-8.

Further, alone or in combination with one or more of Elements 1-8, Embodiments A and C may further include at least one of: Element 9: wherein the dry mixture is included in the drilling fluid at about 0.1 pounds per barrel to about 5 pounds per barrel of the aqueous fluid; Element 10: wherein the drilling fluid has a viscosity of about 50 cP or less at 300 rpm; and Element 11: wherein the portion of the wellbore is deviated or highly-deviated.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Several samples were prepared by producing a dry mixture of partially hydrolyzed polyacrylamide (PHPA), polyacrylate (PAC), and PEG-PPG-PEG triblock copolymer (PLURONIC® F77, available from BASF). An appropriate amount of dry mixture to provide for the concentrations (pounds per barrel (lb/bbl)) listed in Table 1 was then mixed with 350 mL of deionized water for 20 minutes in a mixer having a polytetrafluoroethylene blade at 500 rpm.

Rheology of the resultant samples were measured in a FANN® 35A Viscometer (available from FANN) by measuring the shear stress of the bob at different shear rates between 3 rpm and 600 rpm, results provided in Table 1. The 10 s gel and 10 min gel were measured by allowing the sample to remain static for 10 s or 10 min, respectively, and, then, measuring the maximum deflection at 3 rpm with the FANN® 35A Viscometer. Shale stabilization of the resultant samples was measured by adding the mixed fluid to a glass jar with 20-30 g of reactive shale sized between about ⅜ inch (9.5 mm) and about ½ inch (12.7 mm). The glass jar was then sealed and rolled in a roller oven at room temperature for about 4 hours. After rolling, the sample was passed over a ⅜ inch (9.5 mm) sieve. The retained shale particulates were dried and weighted. The percent erosion is a measure of the amount of shale lost as determined by before and after mass balance. Generally, less than 10% erosion of the reactive shale is preferred.

TABLE 1

| Sample | 1 | 2 | 3 | 4 | 5 | 6 |
|---|---|---|---|---|---|---|
| PHPA (lb/bbl) | 0.42 | 0.42 | 0.42 | 0.42 | 0.42 | 0.42 |
| PAC (lb/bbl) | 0.02 | 0.02 | 0.02 | 0.04 | 0.04 | 0.04 |
| F77 (lb/bbl) | 0.02 | 0.06 | 0.10 | 0.02 | 0.06 | 0.10 |
| 600 rpm | 32.5 | 33 | 33 | 32.5 | 33 | 32.5 |
| 300 rpm | 20.5 | 21 | 21 | 20.5 | 20.5 | 20.5 |
| 200 rpm | 16 | 16 | 16 | 16 | 16 | 16 |
| 100 rpm | 10.5 | 11 | 10.5 | 10 | 10.5 | 10 |
| 6 rpm | 3.5 | 3.5 | 3.5 | 3.5 | 3.5 | 3 |
| 3 rpm | 3 | 3 | 3 | 3 | 3 | 2.5 |
| 10 s gel (lb/100 ft$^2$) | 4 | 4 | 4 | 4 | 4 | 3.5 |
| 10 min gel (lb/100 ft$^2$) | 7 | 7 | 7 | 7 | 7 | 7 |
| % erosion | 5.41 | 3.23 | 3.91 | 5.37 | 7.05 | 2.89 |

The rheology data in Table 1 provides for a drilling fluid suitable for use in drilling wellbores into a subterranean formation, especially for drilling highly deviated wellbores through shale and other clay lithologies where solids control may be an issue as described previously.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing a dry mixture comprising a clay stabilizing agent at about 76% to about 93% by weight of the dry mixture, a dispersant at about 3% to about 6% by weight of the dry mixture, and a surfactant at about 4% to about 18% by weight of the dry mixture;
   mixing the dry mixture into an aqueous fluid, thereby producing a drilling fluid; and
   drilling at least a portion of a wellbore penetrating a subterranean formation with the drilling fluid.

2. The method of claim 1, wherein the portion of the wellbore is deviated.

3. The method of claim 1, wherein the portion of the wellbore is highly deviated.

4. The method of claim 1, wherein the clay stabilizing agent is selected from the group consisting of: polyacrylamide, partially hydrolyzed polyacrylamide, polyethylene glycol, polydialllyldimethylammonium chloride, and any combination thereof.

5. The method of claim 1, wherein the clay stabilizing agent may have a molecular weight of about 10,000 g/mol to about 20,000 g/mol.

6. The method of claim 1, wherein the dispersant is selected from the group consisting of: polyacrylate, sodium acid polyphosphate, sodium hexametaphosphate, lignosulfonate, humic acid, tannic acid, and any combination thereof.

7. The method of claim 1, wherein the dispersant may have a molecular weight of about 10,000 g/mol or less.

8. The method of claim 1, wherein the surfactant is selected from the group consisting of: a polyethylene glycol/polypropylene glycol copolymer, cetylpyridinium chloride, benzalkonium chloride, sodium dodecylsulfate, sodium stearate, a fatty alcohol ethoxylate, a secondary alcohol ethoxylate, and any combination thereof.

9. The method of claim 1, wherein the surfactant may have a molecular weight of about 25,000 g/mol or less.

10. The method of claim 1, wherein the dry mixture is included in the drilling fluid at about 0.1 pounds per barrel to about 5 pounds per barrel of the aqueous fluid.

11. The method of claim 1, wherein the drilling fluid has a viscosity of about 50 cP or less at 300 rpm.

12. The method of claim 1, wherein the dry mixture is American National Standards Institute (ANSI) National Sanitary Foundation (NSF) certified for ANSI/NSF 60.

13. The method of claim 1, wherein the dry mixture is American National Standards Institute (ANSI) National Sanitary Foundation (NSF) certified for ANSI/NSF 61.

14. A drilling fluid additive comprising:
a dry mixture that comprises a clay stabilizing agent at about 76% to about 93% by weight of the dry mixture, a dispersant at about 3% to about 6% by weight of the dry mixture, and a surfactant at about 4% to about 18% by weight of the dry mixture.

15. The drilling fluid additive of claim 14, wherein the clay stabilizing agent is selected from the group consisting of: polyacrylamide, partially hydrolyzed polyacrylamide, polyethylene glycol, polydialllyldimethylammonium chloride, and any combination thereof.

16. The drilling fluid additive of claim 14, wherein the dispersant is selected from the group consisting of: polyacrylate, sodium acid polyphosphate, sodium hexametaphosphate, lignosulfonate, humic acid, tannic acid, and any combination thereof.

17. The drilling fluid additive of claim 14, wherein the surfactant is selected from the group consisting of: a polyethylene glycol/polypropylene glycol copolymer, cetylpyridinium chloride, benzalkonium chloride, sodium dodecylsulfate, sodium stearate, a fatty alcohol ethoxylate, a secondary alcohol ethoxylate, and any combination thereof.

18. A system comprising:
a drilling assembly with a drill string extending therefrom and into a wellbore in a subterranean formation with at least one depleted zone having a plurality of fractures extending from the wellbore into the at least one depleted zone; and
a pump fluidly coupled to the drill string, the drill string containing a drilling fluid prepared by mixing an aqueous fluid with a dry mixture that comprises a clay stabilizing agent at about 76% to about 93% by weight of the dry mixture, a dispersant at about 3% to about 6% by weight of the dry mixture, and a surfactant at about 4% to about 18% by weight of the dry mixture.

19. The system of claim 18, wherein the portion of the wellbore is highly deviated.

* * * * *